(12) United States Patent
Rodriguez et al.

(10) Patent No.: US 11,378,304 B2
(45) Date of Patent: Jul. 5, 2022

(54) FASTENER HOUSING FOR HVAC CASE

(71) Applicant: DENSO International America, Inc., Southfield, MI (US)

(72) Inventors: Javier Rodriguez, Royal Oak, MI (US); Kevin McAlpine, Brighton, MI (US)

(73) Assignee: DENSO International America, Inc., Southfield, MI (US)

(*) Notice: Subject to any disclaimer, the term of this patent is extended or adjusted under 35 U.S.C. 154(b) by 119 days.

(21) Appl. No.: 16/828,276

(22) Filed: Mar. 24, 2020

(65) Prior Publication Data

US 2021/0207844 A1  Jul. 8, 2021

Related U.S. Application Data

(60) Provisional application No. 62/958,344, filed on Jan. 8, 2020.

(51) Int. Cl.
*F24F 13/20* (2006.01)
(52) U.S. Cl.
CPC .................................. *F24F 13/20* (2013.01)

(58) Field of Classification Search
CPC ... F24F 13/20; B60H 1/00535; B60H 1/0055; F16B 37/04; F16B 37/044; F16B 37/045; F16B 5/0657
See application file for complete search history.

(56) References Cited

U.S. PATENT DOCUMENTS

| | | | |
|---|---|---|---|
| 6,351,962 B1* | 3/2002 | Mizutani | B60H 1/00528 180/90 |
| 8,353,649 B2* | 1/2013 | Csik | F16B 39/284 411/111 |
| 9,850,936 B2* | 12/2017 | Tanabe | F16B 5/02 |
| 2015/0369273 A1* | 12/2015 | Saitou | F16B 37/041 411/173 |

* cited by examiner

*Primary Examiner* — Edelmira Bosques
*Assistant Examiner* — Michael James Giordano
(74) *Attorney, Agent, or Firm* — Harness, Dickey & Pierce, P.L.C.

(57) ABSTRACT

A heating, ventilation, and air conditioning (HVAC) case including a mount for mounting the HVAC case to a vehicle dash with a fastener. A fastener housing is defined by the mount for receiving the fastener therein. The fastener housing includes an aperture configured to receive a shank of the fastener. The fastener housing further includes a head housing configured to receive a head of the fastener. The head housing includes a locator portion configured to center the head in the head housing and a stress relief portion between the locator portion and the aperture.

19 Claims, 4 Drawing Sheets

FASTENER HOUSING FOR HVAC CASE

CROSS-REFERENCE TO RELATED APPLICATION

This application claims the benefit of U.S. Provisional Application No. 62/958,344 filed on Jan. 8, 2020, the entire disclosure of which is incorporated herein by reference.

FIELD

The present disclosure relates to a fastener housing for a heating, ventilation, and air conditioning (HVAC) case.

BACKGROUND

This section provides background information related to the present disclosure, which is not necessarily prior art.

Vehicles often include a heating, ventilation, and air conditioning (HVAC) case secured to a dash of the vehicle with a fastener. The HVAC case often includes a datum or locator mount defining a fastener housing, in which a portion of the fastener is seated. While current HVAC case mounts are suitable for their intended use, they are subject to improvement. The present disclosure advantageously provides for an HVAC case mount defining an improved fastener housing.

SUMMARY

This section provides a general summary of the disclosure, and is not a comprehensive disclosure of its full scope or all of its features.

The present disclosure provides for a heating, ventilation, and air conditioning (HVAC) case including a mount for mounting the HVAC case to a vehicle dash with a fastener. A fastener housing is defined by the mount for receiving the fastener therein. The fastener housing includes an aperture configured to receive a shank of the fastener. The fastener housing further includes a head housing configured to receive a head of the fastener. The head housing includes a locator portion configured to center the head in the head housing and a stress relief portion between the locator portion and the aperture.

The present disclosure further provides for a heating, ventilation, and air conditioning (HVAC) case including a mount for mounting the HVAC case to a vehicle dash with a fastener. A fastener housing is defined by the mount for receiving the fastener therein. The fastener housing includes an aperture configured to receive a shank of the fastener. The fastener housing further includes a head housing configured to receive a head of the fastener. The head housing includes a locator portion configured to center the head in the head housing and a stress relief portion between the locator portion and the aperture. A first outer sidewall of the stress relief portion is further from a center of the head housing than a second outer sidewall of the locator portion. A gap is defined between the first outer sidewall and the head of the fastener seated in the locator portion, the gap configured to reduce stress at the fastener housing Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
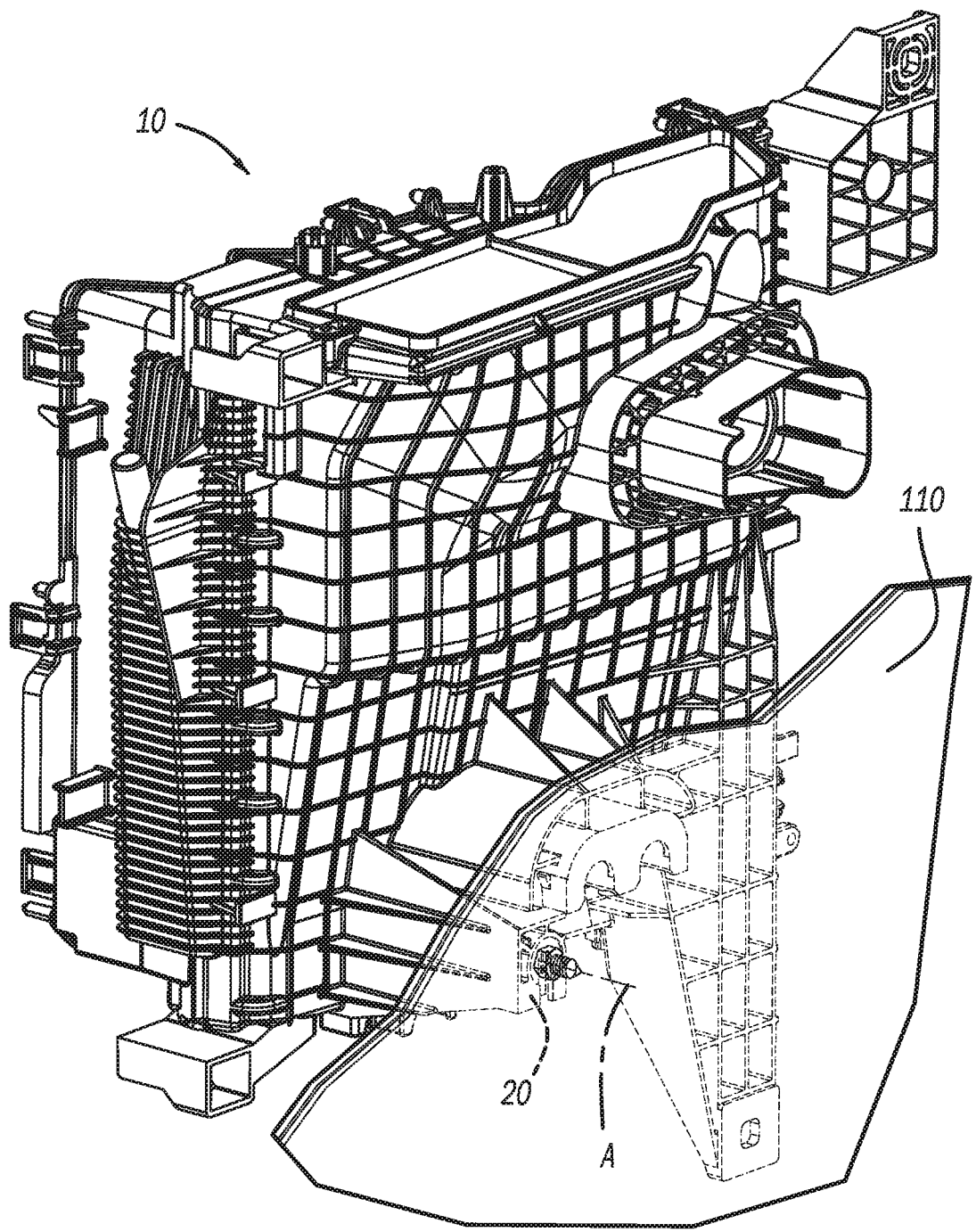
FIG. 1 is a perspective view of a heating, ventilation, and air conditioning (HVAC) case mounted to a vehicle dash.

FIG. 1 illustrates an exemplary heating, ventilation, and air conditioning (HVAC) case 10 for any suitable HVAC system, such as a vehicle HVAC system. The vehicle HVAC system may be configured for use with any suitable vehicle, such as any suitable passenger vehicle, mass transit vehicle, recreational vehicle, utility vehicle, construction vehicle/equipment, military vehicle/equipment, watercraft, aircraft, etc. The HVAC case 10 may also be configured for use with any suitable non-vehicular application, such as a building HVAC system. The HVAC case 10 may include an evaporator and/or heater core for heating or cooling airflow directed through the HVAC case 10.

Figure 3A:
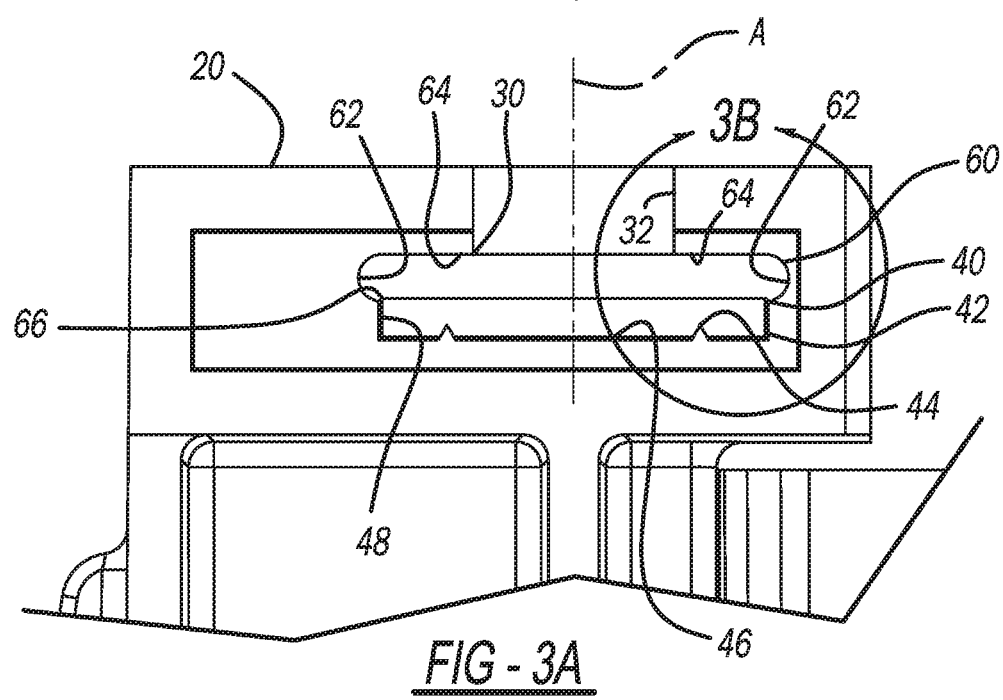
FIG. 3A is a cross-sectional view taken along line 3A-3A of FIG. 2.
Figure 3B:
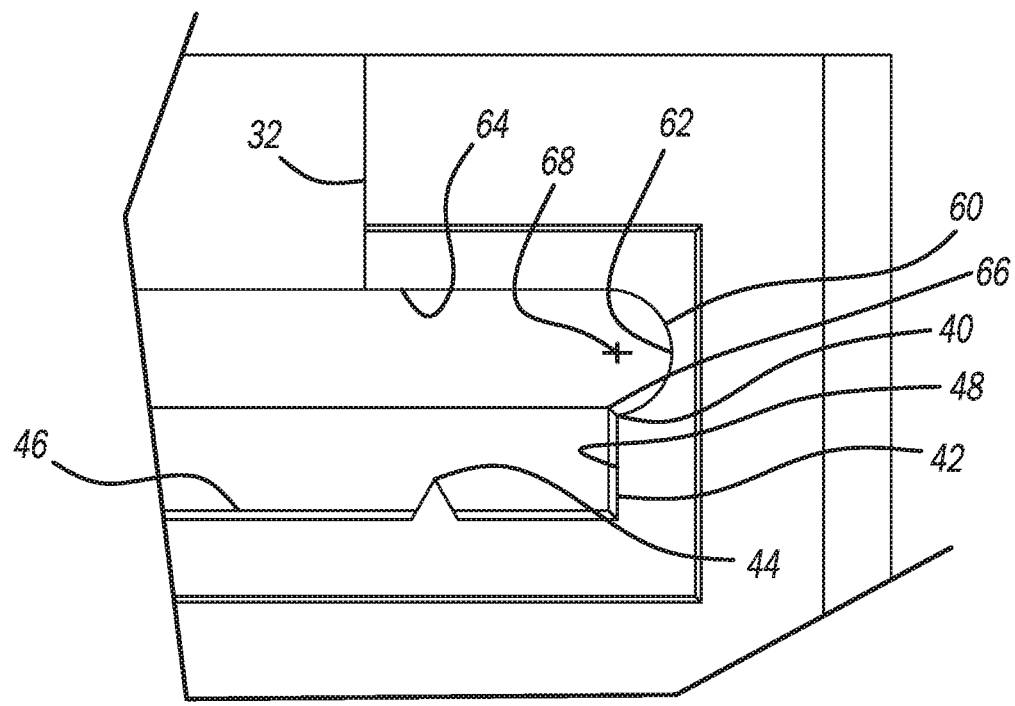
FIG. 3B illustrates area 3B of FIG. 3A.
Figure 4:
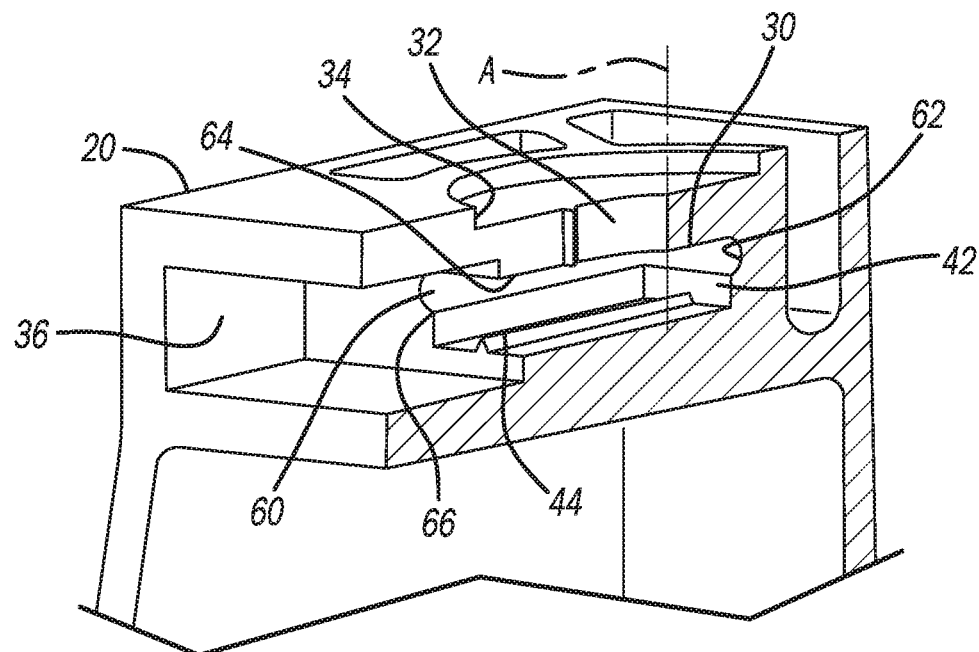
FIG. 4 is a cross-sectional view taken along line 4-4 of FIG. 2.

The HVAC case 10 includes a mount 20 for mounting the HVAC case 10 at any suitable location. For example, the HVAC case 10 may be mounted to a vehicle dash 110 (FIGS. 1 and 5) by way of the mount 20, as described further herein. With continued reference to FIG. 1, and additional reference to FIGS. 2-4, for example, the mount 20 defines a fastener housing 30 for receiving any suitable fastener configured to secure the HVAC case 10 to the dash 110.

The fastener housing 30 defines an aperture 32. At an outer surface of the fastener housing 30 spaced apart from, and partially surrounding, the aperture 32 is a recess 34. The recess 34 may be sized and shaped to accommodate, for example, a rubber seal 90, as described herein and illustrated in FIG. 5. The fastener housing 30 further defines a slot 36. The slot 36 is sized and shaped to receive any suitable fastener, such as a bolt 70 (FIG. 5) described herein.

The fastener housing 30 further includes a head housing 40. The head housing 40 has a locator portion 42 and a stress relief portion 60. The stress relief portion 60 is between the locator portion 42 and the aperture 32.

The locator portion 42 may include one or more locator tabs 44 extending from a base 46 of the locator portion 42. Extending from an outer circumference of the base 46 is an outer sidewall 48. The outer sidewall 48 extends from the base 46 to the stress relief portion 60. The outer sidewall 48 may be a circular sidewall or a generally circular sidewall. The outer sidewall 48 may extend from the base 46 at a right angle or about a right angle.

The stress relief portion 60 includes an outer sidewall 62. The outer sidewall 62 may be curved, such as in the example illustrated. A planar base 64 extends from the curved outer sidewall 62 to the aperture 32.

An edge 66 is at an interface between the outer sidewall 48 of the locator portion 42 and the curved outer sidewall 62 of the stress relief portion 60. A center of curvature 68 (FIG. 3B) of the curved outer sidewall 62 is opposite to the edge 66 and thus aligned with the outer sidewall 48 of the locator portion 42. Although the outer sidewall 62 is illustrated as being curved, the outer sidewall 62 need not be curved and can have any other suitable shape configured to facilitate stress relief within the fastener housing. The curved outer sidewall 62 may have any suitable curve radius.

Longitudinal line A extends through an axial center of each one of the aperture 32, the locator portion 42, and the stress relief portion 60. The longitudinal line A is at a right angle to the base 46, and at a radial center of the base 46 when the base 46 is configured as a circular base. The outer sidewall 62 of the stress relief portion 60 is further from the longitudinal line A than the outer sidewall 48 of the locator portion 42. Thus, in applications where the outer sidewalls 48, 62 are circular, the stress relief portion 60 has a larger radius than the locator portion 42. This relatively larger radius of the stress relief portion 60, and the outer sidewall 62 being arranged outboard of the outer sidewall 48, advantageously disperses stress forces at the interface between the bolt 70 and the fastener housing 30, such as at the planar base 64, for example.

Figure 2:
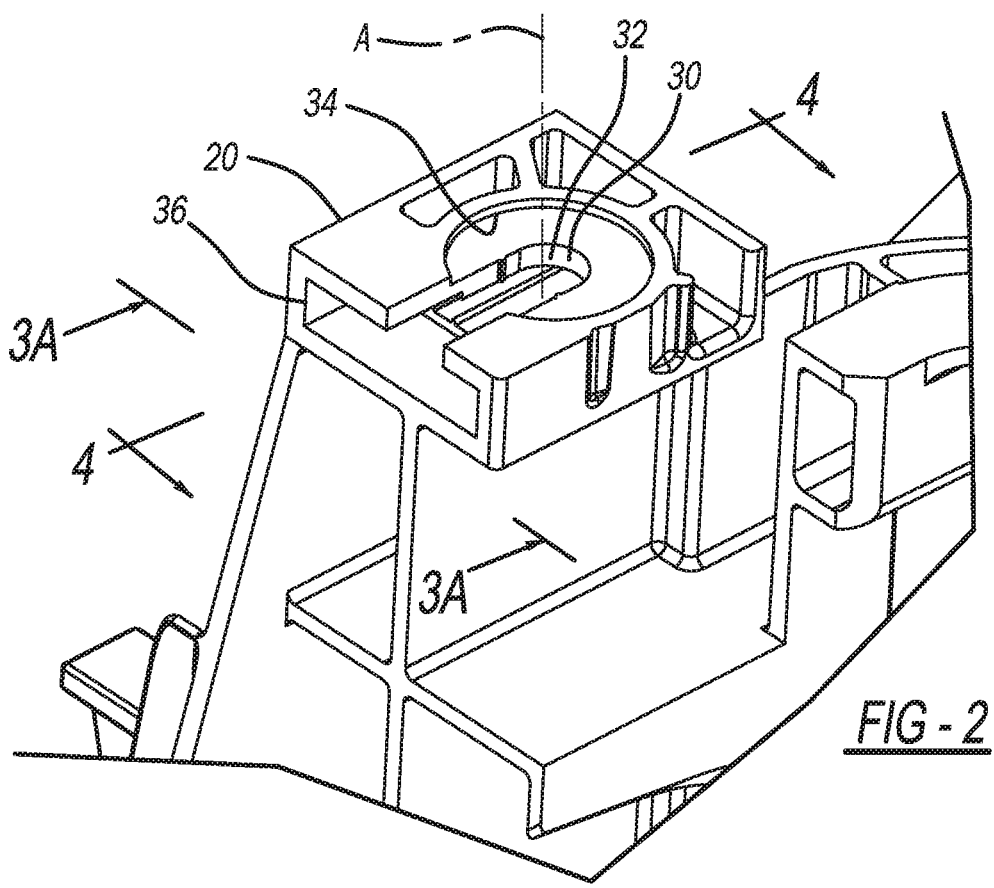
FIG. 2 is a perspective view of a mount of the HVAC case of FIG. 1.
Figure 5:
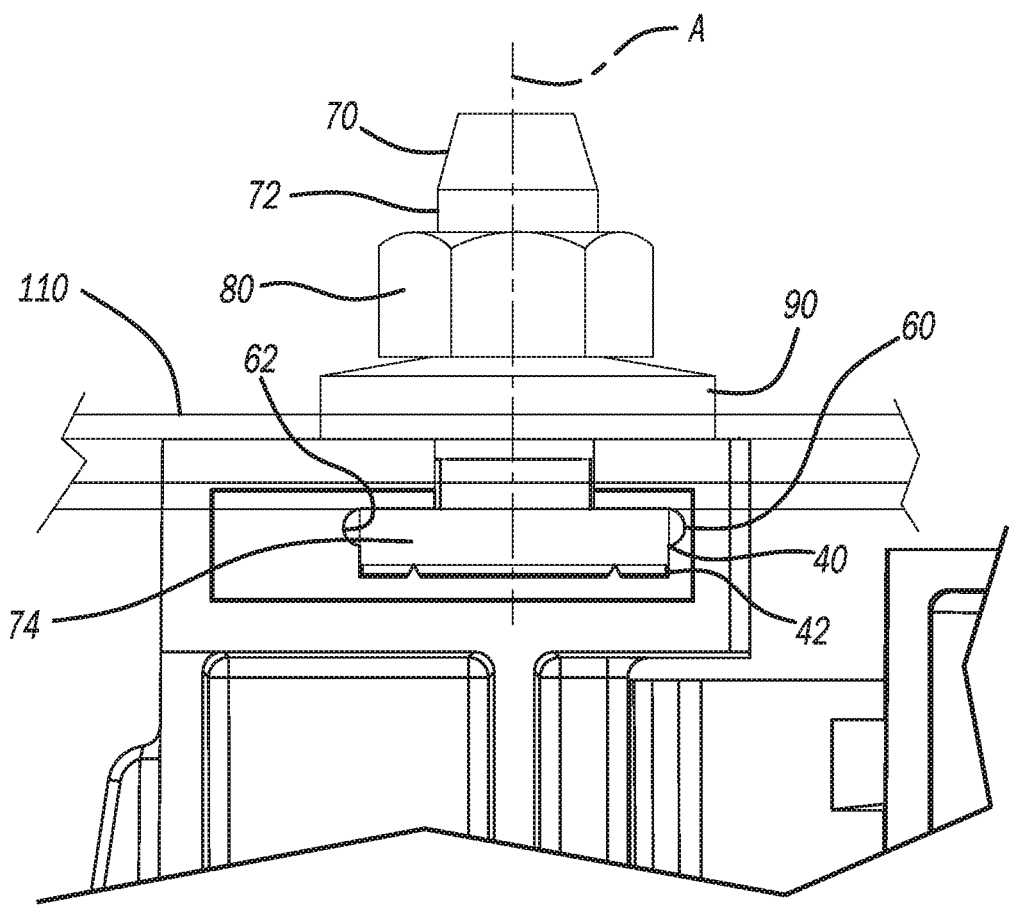
FIG. 5 is a cross-sectional view of the mount of FIG. 2 coupled to the vehicle dash with a fastener.

FIG. 5 illustrates the HVAC case 10 fastened to the exemplary vehicle dash 110 with the exemplary bolt 70. The bolt 70 includes a shank 72 and a head 74. A nut 80 is threaded onto the shank 72. Between the nut 80 and the dash 110 is any suitable seal 90, such as a rubber seal in the form of a washer. The seal 90 is sized and shaped to fit within the recess 34 about the aperture 32 (FIG. 2).

The head 74 is slid through the slot 36 into the head housing 40. A top portion of the head 74 is seated in the locator portion 42. The head 74 is sized and shaped such that an outermost portion of the head 74 closely abuts the outer sidewall 48 (FIGS. 3A and 3B) of the locator portion 42. Cooperation between the head 74 at both the base 46 (including the locator tabs 44 extending therefrom) and the outer sidewall 48 centers the bolt 70 within the fastener housing 30 such that a longitudinal axis of the shank 72 extends along the longitudinal line A. The shank 72 extends through the aperture 32 and through the dash 110. On a side of the dash 110 opposite to the HVAC case 10, the nut 80 is threaded onto the shank 72 to compress the rubber seal 90 against the dash 110.

A portion of the head 74 is arranged within the stress relief portion 60. The curved outer sidewall 62 of the stress relief portion 60 is outboard of an outermost surface of the head 74 relative to the longitudinal line A. Thus, a gap is defined between the head 74 and the curved outer sidewall 62 of the stress relief portion 60. This gap, which may be any shape and suitable size, advantageously relieves stress within the head housing 40, particularly where the planar base 64 meets the curved outer sidewall 62.

The stress relief portion 60 is formed as a cutout within the structure of the HVAC case 10 forming the mount 20. The cutout reduces the amount of material used to form the mount 20 as compared to existing mounts, and thus advantageously reduces costs. One skilled in the art will appreciate that the present disclosure provides numerous additional advantageous and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) case comprising:
   a mount for mounting the HVAC case to a vehicle dash with a fastener;
   a fastener housing defined by the mount for receiving the fastener therein, the fastener housing including:
      an aperture configured to receive a shank of the fastener; and
      a head housing configured to receive a head of the fastener, the head housing including a locator portion configured to center the head in the head housing and a stress relief portion between the locator portion and the aperture; and
   a recess formed on an outer surface of the head housing, the recess configured to receive a seal of the fastener.

2. The HVAC case of claim 1, wherein the HVAC case is an evaporator case.

3. The HVAC case of claim 1, wherein the fastener is a bolt.

4. The HVAC case of claim 1, wherein a radial center of the aperture is aligned with a radial center of the head housing.

5. The HVAC case of claim 1, wherein the stress relief portion extends further from a radial center of the head housing than the locator portion.

6. The HVAC case of claim 1, wherein the stress relief portion is a radial cutout.

7. The HVAC case of claim 1, wherein the stress relief portion includes a curved sidewall.

8. The HVAC case of claim 1, wherein the stress relief portion includes an outer radius.

9. The HVAC case of claim 8, wherein the stress relief portion of the head housing includes a planar sidewall extending from the outer radius to the aperture.

10. The HVAC case of claim 8, wherein a center of curvature of the outer radius is aligned with a locator sidewall of the locator portion.

11. The HVAC case of claim 10, wherein the head housing defines an edge between the locator portion and the stress relief portion.

12. The HVAC case of claim 1, wherein the locator portion of the head housing is further configured to center the shank within the aperture.

13. A heating, ventilation, and air conditioning (HVAC) case comprising:
   a mount for mounting the HVAC case to a vehicle dash with a fastener;
   a fastener housing defined by the mount for receiving the fastener therein, the fastener housing including:
      an aperture configured to receive a shank of the fastener; and
      a head housing configured to receive a head of the fastener, the head housing including a locator portion configured to center the head in the head housing and a stress relief portion between the locator portion and the aperture, a first outer sidewall of the stress relief portion is further from a center of the head housing than a second outer sidewall of the locator portion; and
   a recess formed on an outer surface of the head housing, the recess configured to receive a seal of the fastener;
   wherein a gap is defined between the first outer sidewall and the head of the fastener seated in the locator portion, the gap configured to reduce stress at the fastener housing.

14. The HVAC case of claim 13, wherein the first outer sidewall of the stress relief portion is curved.

15. The HVAC case of claim 14, wherein the first outer sidewall is a radial cutout defined by the head housing.

16. The HVAC case of claim 13, wherein both the first outer sidewall and the second outer sidewall are circular.

17. The HVAC case of claim 13, wherein the head housing defines an edge between the first outer sidewall and the second outer sidewall.

18. The HVAC case of claim 13, wherein the second outer sidewall extends at a right angle from a base of the locator portion.

19. The HVAC case of claim 18, further comprising a locator tab extending from the base of the locator portion.

* * * * *